Jan. 19, 1943.  C. L. EKSERGIAN  2,308,501
MASTER CYLINDER
Filed Aug. 3, 1940
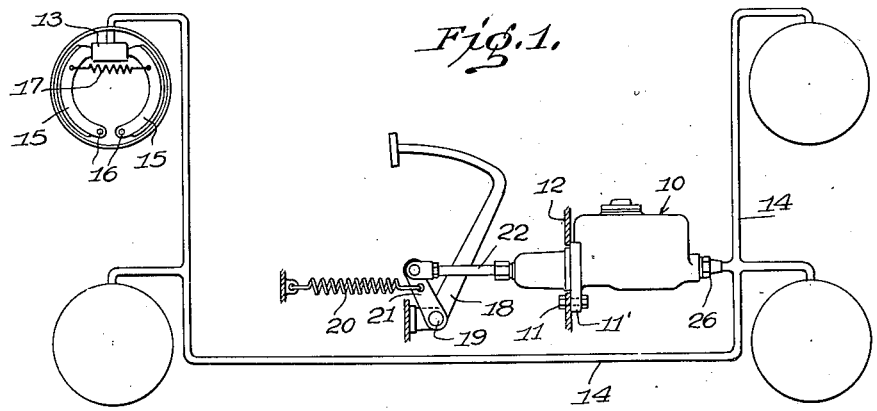
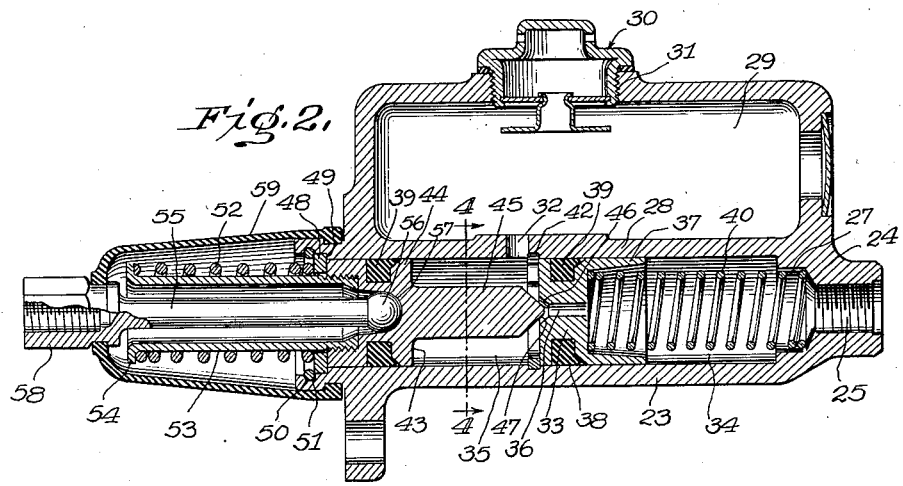
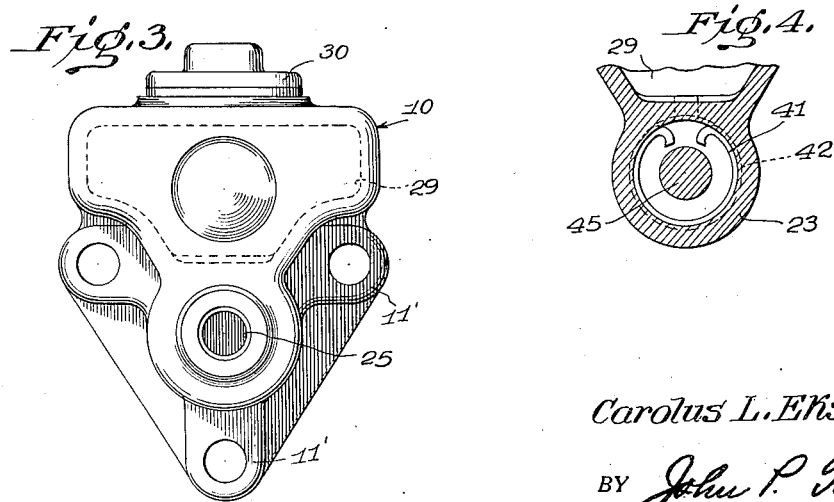
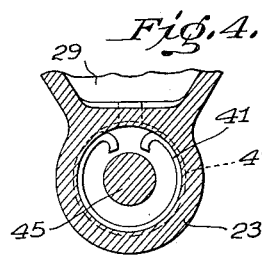
INVENTOR
Carolus L. Eksergian
BY John P. Darby
ATTORNEY Patented Jan. 19, 1943

2,308,501

UNITED STATES PATENT OFFICE 2,308,501

MASTER CYLINDER

Carolus L. Eksergian, Detroit, Mich., assignor to Budd Wheel Company, Philadelphia, Pa., a corporation of Pennsylvania Application August 3, 1940, Serial No. 350,691

2 Claims. (Cl. 60—54.6)

The invention relates to fluid pressure cylinder devices, and more particularly to such devices adapted for use in hydraulic braking systems and commonly designated master cylinders.

It is among the objects of my invention to provide a device of this class which can be used in a system in which the fluid is normally under a pressure not exceeding atmospheric pressure, which is simple in construction, readily fabricated and assembled and which permits the fluid to expand or contract under temperature changes and avoids the formation of a vacuum in, or leakage from, the system, thus maintaining the system at all times filled with fluid.

These objects are attained by the provision of a simple combined master cylinder and supply reservoir unit in which the fluid has a gravity feed from the supply reservoir to the cylinder and is under atmospheric pressure. The cylinder may be a uniform bore from end to end, closed at the front or pressure end except for the opening leading therefrom to the transmission conduit of the system and open at the rear end, so that the piston and plunger can be readily assembled from the open rear end. The piston has a fluid-tight seal with the cylinder wall and a central port controlled by a valve operated by the plunger which operates the piston. To maintain this valve open at all times during the return stroke of the parts, and to insure the return of the parts to the retracted position, independent resilient return means are provided for the plunger and piston, the resilient return means for the plunger being quicker-acting, so as to return the plunger at a more rapid rate, than the return means for the piston. A port is provided between the reservoir and cylinder which insures constant communication between them. When the parts are in retracted position, and during the return movement, there is thus insured a constant communication between the chamber in front of the piston and the reservoir. This permits the fluid to flow from the reservoir to the system or vice versa, thus insuring that the system is normally never under excessive pressure such as might result in the breaking of parts and leakage. Such excess pressure may be caused, for example, by expansion of the fluid under heat. Nor can the system develop any appreciable vacuum in the return stroke of the parts, such as might result in the sucking of air into the system. Simple and readily removable limit stops may be provided for piston and plunger, and these are so located as to insure the open communication from reservoir to the front of the piston in the retracted or normal position. The resilient means for returning the plunger and piston may be simple coil springs so arranged as to provide a compact master cylinder unit.

Other and further objects and the manner in which they are attained will become apparent from the following detailed description when read in connection with the drawing forming a part hereof.

In the drawing,

Fig. 1 is a diagram showing the application of the master cylinder to a hydraulic braking system;

Fig. 2 shows the combined master cylinder and supply reservoir unit in longitudinal vertical section and on an enlarged scale;

Fig. 3 is an end elevational view thereof as seen from the right in Fig. 2;

Fig. 4 is a fragmentary section taken substantially on the line 4—4 of Fig. 2.

Referring to the diagram of Fig. 1, a master cylinder unit, indicated generally by the reference numeral 10, is shown mounted as on a vertical vehicle body panel 12 by bolts 11 passing through integral lugs 11' on the unit and the panel 12. It is connected as usual with the brake cylinders as 13 of the four wheels of the vehicle by the branched conduit system generally indicated by numeral 14. Since the brakes of the four wheels may be assumed to be alike, only one of them is shown in detail and this more or less diagrammatically. It may consist of the brake shoes 15 pivoted at 16 and having their free ends engaging the pistons (not shown) of the brake cylinder 13, between which the fluid pressure is admitted to expand the shoes against the return spring 17 when the brakes are applied.

Pressure may be applied to the system for operating the brakes by the usual pedal lever 18 pivoted at 19 upon a suitable part of the vehicle, this pedal being returned by the return spring indicated at 20. It is connected through its arm 21 and adjustable strut link 22 to the master cylinder device 10.

In the form of the invention selected for illustration, the master cylinder device comprises a unitary casting which is formed in its lower portion with the longitudinal cylinder bore 23, which is preferably closed at its front or pressure end by a wall 24 provided with a screw-threaded opening 25 for attachment thereto of the fitting 26 (see Fig. 1) of the conduit system 14. As shown, the cylinder bore is of uniform diameter from the closed to the open end of the cylinder, except for a short reduced diameter extension 27 toward the closed end, which is provided for a purpose which will be referred to hereinafter.

Directly above the cylinder bore 23 and separated from it by a wall 28 is the fluid supply reservoir 29 which may be provided with a suitable breathing and filling plug 30 which may be screwed into an opening 31 in the top wall of the reservoir. A port 32 in the wall 28 places the reservoir is communication with the cylinder bore 23.

The piston 33 is normally located intermediate the ends of the cylinder bore 23 and divides the cylinder into two chambers, one a front or pressure chamber 34 and the other a rear or supply chamber 35. These chambers are normally in communication with each other through a central port 36 in the piston, which is valve controlled as hereinafter described.

The piston is shown provided with a forwardly extending skirt 37 giving it a wide bearing on the wall of the cylinder. It is sealed fluid-tight with said wall by a sealing means comprising an annular groove 38 in which is seated a rubber sealing ring 39 pressing against the wall of the cylinder.

The piston is returned by an independent resilient means such as a coil spring 40 seated at one end in the pocket formed by the skirt 37 at its open end and in the reduced extension 27 of the bore at the closed end of the cylinder. This spring will be relatively light, just heavy enough to return the piston against the frictional force developed between the piston and its sealing means and the cylinder wall.

Its return movement is limited by a positive stop, such as the split resilient ring 41, seated in an annular groove 42 in the cylinder wall, this stop being located in front of the port 32 between the reservoir and cylinder, thus preventing the closing of the port by the piston.

The piston is operated by a plunger 43 having an enlarged piston-like guiding head 44 guided by the bore 23 of the cylinder and a reduced forward extension 45 spaced from the cylinder wall.

The valve means controlling the piston port 36 may comprise an annular valve seat 46 on the piston concentric with the bore 36 and a cooperating valve seat 47 on the extension 45.

The body of the plunger 44 may be sealed against the cylinder wall by a sealing ring 39 similar to the sealing ring in the piston 33 to prevent leakage of fluid from the chamber 35 past the plunger. In its normal return position, as shown in Fig. 2, the plunger rests against a stop adjacent the open end of the cylinder which may comprise a ring 48 seated against a shoulder 49 formed by a short enlargement of the extreme end of the cylinder bore, this ring being removably held in place as by a resilient split ring 50 seated in a groove 51.

The plunger is provided with independent resilient return means shown as comprising a relatively heavy coil spring 52 appreciably stronger than the piston return spring 40, and this spring is supported by a tubular rear extension 53 of the plunger which may be screw-threadedly engaged with a recess in the rear face of the plunger. The spring 52 encircles the extension 53 and bears at one end against the shoulder 54 at the rear end of the extension, and at its other forward end against the cylinder through the ring 48.

In the form of the invention shown, the plunger is actuated by the forward end of the strut link 22 which may be a separate piece 55 for purposes of assembly with the master cylinder unit, this piece being in the form of a rod having an enlarged spherical head 56 engaging a recess in the plunger head 44 of the diameter of said head, and having a semi-cylindrical face 57 cooperating with the cylindrical head of the rod 55. This connection between the rod and the plunger head permits independent return movement of the rod with the brake pedal under the action of the brake pedal spring 20 as soon as the pressure is released from the pedal. The rod 55 is also of smaller diameter than the surrounding sleeve 53 so as to permit the required pivoting movement between the rod and the plunger.

The outer end of the rod 55 has an enlarged head 58 through which it may be adjustably connected to the brake lever end of the strut link 22 in the usual manner. Between the enlarged head and the end of the master cylinder is arranged a flexible boot 59 to prevent the entrance of dirt to the parts housed by the boot.

While, in the preferred form shown, the pedal lever and the plunger are independently returnable to retracted position and are provided with separate springs for this purpose, it will be understood that a number of the features of the invention may be realized by a construction in which the plunger and the pedal lever are connected to move together and are returned by the same spring.

The operation of the device will now be described.

With all the parts in the retracted position shown in the drawing, it will be seen that the valve seats 46 and 47 on the piston and plunger, respectively, are separated from each other, and the fluid in the supply reservoir is in communication through port 32 with the chamber 35 in rear of the piston, the port 33 in the piston, and the chamber 34 in front of the piston so that the system is kept continuously filled. If now the brake pedal lever is depressed, the plunger 43 in the initial portion of its working stroke is moved to close the piston port 33 by the engagement of its valve seat 47 with the valve seat 46 on the piston, and in the further movement of the plunger, the piston will be operated to compress the fluid in the chamber 34 and the entire system connected with it, including the conduit system 14 and the brake cylinders 13 to apply the brakes. In this movement, the return springs 40, 52 and 20 will be compressed to store energy in them. Upon the release of the brake pedal, the lever 18 with its connecting link strut 22 is immediately returned by the spring 20, and the plunger 43, because it is actuated by a stronger spring 52, is in the initial return movement moved away from the piston to open the port 36 closed by valve seats 46, 47, and this open relation is maintained during the entire return stroke of the piston and plunger.

It is important that the piston port be immediately opened before the piston commences its return movement and be retained open during the return of the piston. If this port should be closed during the return of the piston, a partial vacuum might be created in front of the piston which would tend to suck air into the system.

The fluid may be returned from the brake cylinders as 13 by the brake shoe return spring 17. Were it not for the friction in the conduit system and the inertia of the parts operated by the springs 17, such partial vacuum might not occur. However, it may happen that because of this resistance that the brake cylinder pistons are not fully returned until after the return of the parts of the master cylinder. In this event, fluid may pass through the open valves 36 and 32 to the supply reservoir to allow the full return of the brake cylinder pistons. It may happen, therefore, that in the early part of the return of the brake cylinder piston, fluid will flow from the reservoir to the system, and in the return position fluid may flow in the reverse direction. In any event, the arrangement maintaining the piston port 36 and reservoir port 32 open at all times in the return movement and in the retracted position insures that the system will be maintained at all times at the pressure obtaining in the reservoir of the master cylinder, namely atmospheric pressure. This insures that the system will be always filled and that no air will be sucked into the system.

While the invention has herein been described in connection with a specific embodiment, it will be understood that changes and modifications could be made by those skilled in the art without departing from the spirit and scope of the terminology of the claims appended hereto.

What is claimed is:

1. A master fluid pressure device of the class described comprising a cylinder, a piston reciprocable therein, a fluid-tight seal between said piston and cylinder, said piston dividing the cylinder into front and rear chambers and having a central port therein establishing communication between said chambers, a fluid supply reservoir associated with said cylinder, a port establishing communication between said reservoir and said rear chamber, a plunger for operating the piston, valve means including cooperating valve seats on the piston and plunger for controlling said piston port, the working stroke of the plunger first closing said piston port and thereafter operating the piston to compress the fluid in front thereof, independent resilient means for returning said plunger and piston, the plunger return means being quicker acting, during the return movement of said plunger and piston, then the piston return means whereby to separate said cooperating valve seats in the initial return of the plunger and maintain them separated during the entire return movement of the plunger and piston, and a positive stop limiting the return movement of the piston to a position insuring the open condition of said piston and reservoir ports in the full retracted position of the parts, the cylinder being open at the rear end and provided with a removable stop to limit the return movement of the plunger, the plunger having a piston-like body portion guided by the cylinder and a reduced extension beyond the open end of the cylinder, said extension being formed with a shoulder at its rear end, and the return means for the plunger comprising a coil spring surrounding the reduced extension and bearing at one end against said shoulder and at the other against the cylinder end.

2. A master fluid pressure device of the class described comprising a cylinder, a piston reciprocable therein, a fluid-tight seal between said piston and cylinder, said piston dividing the cylinder into front and rear chambers and having a central port therein establishing communication between said chambers, a fluid supply reservoir associated with said cylinder, a port establishing communication between said reservoir and said rear chamber, a plunger for operating the piston, valve means including cooperating valve seats on the piston and plunger for controlling said piston port, the working stroke of the plunger first closing said piston port and thereafter operating the piston to compress the fluid in front thereof, independent resilient means for returning said plunger and piston, the plunger return means being quicker acting, during the return movement of said plunger and piston, than the piston return means whereby to separate said cooperating valve seats in the initial return of the plunger and maintain them separated during the entire return movement of the plunger and piston, and a positive stop limiting the return movement of the piston to a position insuring the open condition of said piston and reservoir ports in the full retracted position of the parts, the plunger having a piston-like body portion guiding it in the cylinder bore and a reduced forward extension therefrom carrying the valve seat, means for sealing the body portion of the plunger with the cylinder wall to prevent leakage of fluid past said body, the space between the body portion of the plunger and the rear face of the piston being at all times in communication with the port from the supply reservoir, a removable stop at the rear end of the cylinder limiting the return movement of the plunger, a reduced extension from the end of the body portion of the plunger extending rearwardly beyond the stop and cylinder, and the return means for the plunger comprising a coil spring encircling said reduced rearward extension and bearing at its one end against a shoulder on the extension and at the other against the cylinder.

CAROLUS L. EKSERGIAN.